(12) United States Patent
Suzuki (10) Patent No.: US 8,230,015 B2
(45) Date of Patent: Jul. 24, 2012

(54) MESSAGE POSTING SYSTEM

(75) Inventor: Aya Suzuki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 376 days.

(21) Appl. No.: 12/611,957

(22) Filed: Nov. 4, 2009

(65) Prior Publication Data

US 2010/0250652 A1 Sep. 30, 2010

(30) Foreign Application Priority Data

Nov. 6, 2008 (JP) .................................. 2008-286000

(51) Int. Cl.
*G06F 15/16* (2006.01)
(52) U.S. Cl. ....................................... 709/204; 709/226
(58) Field of Classification Search .................. 709/204, 709/226
See application file for complete search history.

(56) References Cited

U.S. PATENT DOCUMENTS

| | | | | |
|---|---|---|---|---|
| 6,571,234 B1 * | 5/2003 | Knight et al. | ........................... | 1/1 |
| 6,898,631 B1 * | 5/2005 | Kraft et al. | ..................... | 709/224 |
| 7,124,164 B1 * | 10/2006 | Chemtob | ...................... | 709/204 |
| 7,159,011 B1 * | 1/2007 | Knight et al. | ................. | 709/207 |
| 7,328,242 B1 * | 2/2008 | McCarthy et al. | ............ | 709/204 |
| 7,424,516 B2 * | 9/2008 | Leeds | ........................... | 709/206 |
| 2006/0176831 A1 * | 8/2006 | Greenberg et al. | ........... | 370/260 |
| 2007/0078675 A1 | 4/2007 | Kaplan | | |
| 2007/0156824 A1 | 7/2007 | Thompson | | |
| 2009/0089686 A1 * | 4/2009 | Chen et al. | .................... | 715/759 |

FOREIGN PATENT DOCUMENTS

| | | |
|---|---|---|
| JP | 2006-227711 | 8/2006 |
| JP | 2007-42137 | 2/2007 |

OTHER PUBLICATIONS

J. Palme, "Information Filtering", Proceedings of the ITS'98 conference 1998, XP002562497, Retrieved from the Internet: URL:http://cmc.dsv.su.se/select/information-filtering.html>, on Jan. 11, 2010.
Resnick P. et al., "Grouplens: An Open Architecture for Collaborative Filtering of Netnews", Proceedings of Conference on Computer-Supported Cooperativework, Oct. 7-10, 1994 , pp. 175-186, XP000601284.
J. Murison, "Messageboard topic tagging: user tagging of collectively owned community content", Proceedings of the 2005 conference on Designing for User experience, San Francisco, CA, Designing for User Experiences vol. 135, 5, 2005, pp. 1-9, XP002562498, ISBN: 1-59593-250-X, Retrieved from the Internet: URL:http://portal.acm.org/citation.cfm?id=1138235.1138241>, on Jan. 8, 2010.
Björn Engdahl, Malin Köksal, Gary Marsden: "Using treemaps to Visualize threaded discussion forums on PDAs", CHI '05: CHI '05 extended abstracts on Human factors in computing systems 2005, pp. 1355-1358, XP002562499, Portland, OR, USA DOI: http://doi.acm.org/10.1145/1056808.1056915, ISBN: 1-59593-002-7, Retrieved from the Internet: URL:http://portal.acm.org/citation.cfm?id=1056915>, on Jan. 8, 2010.

* cited by examiner

*Primary Examiner* — Patrice Winder
(74) *Attorney, Agent, or Firm* — Greenblum & Bernstein, P.L.C.

(57) ABSTRACT

A server unit provides a message board on a predetermined topic in which multiple unspecified users participate. A user can designate a message posted by an arbitrary user on the message board on the predetermined topic, as a watch target. When a plurality of users designate the same message on the message board on the predetermined topic as a watch target and post new messages on the message to be watched within a predetermined period, the users who have designated the same message as the watch target are grouped. The grouped users can use a message board for a temporary topic which is provided as separate from the message board for the predetermined topic.

6 Claims, 3 Drawing Sheets

TOPIC R
| | |
|---|---|
| 101A | AAA... |
| 101B | BBB... |
| 101C | CCC... |
| 101D | DDD... |
| 101E | EEE... |
| 101F | FFF... |

FIG.4B

TOPIC R
| | |
|---|---|
| 101C | XXX... |
| 101A | AAA... |
| 101B | BBB... |
| 101D | DDD... |
| 101E | EEE... |
| 101F | FFF... |

FIG.4C

TOPIC R
| | |
|---|---|
| 101C | XXX... WATCH — 102 |
| 101A | AAA... |
| 101B | BBB... |
| 101D | DDD... |
| 101E | EEE... |
| 101F | FFF... |

FIG.4D

TEMPORARY TOPIC T
| | |
|---|---|
| 101B | YYY... |
| 101E | ZZZ... |
| 101C | XXX... |

FIG.4E

MESSAGE POSTING SYSTEM

BACKGROUND OF THE INVENTION

1. Field of the Invention

The present invention relates to a message posting system in which each of users of a plurality of terminal devices connected to a server unit that provides a message board for each of a plurality of topics in which unspecified users can participate is allowed to post a message on a message board for an arbitrary topic.

2. Description of the Related Art

There are message boards which are provided on a network and on which unspecified users can post messages. Such message boards include a chat system which allows individual users to enjoy chatting in real time and a bulletin board on which individual users exchange opinions to develop a discussion. While those message boards differ from each other in whether or not the real-time action is involved, they basically do not have a significant difference in sequentially displaying messages posted by individual users. A topic is normally specified for a message board. Users post messages on a message board for the topic.

As unspecified users post messages on a message board, multiple users are likely to post messages in the same period. When many messages are posted in the same period, it is very difficult for each user to find a message on which the user wants to comment or find where the original message on which comments are given is located. A similar problem may occur for a message board which has a relatively low frequency of message posting if the viewing duration of a user becomes long.

Such a problem occurs prominently when a user is using a terminal device like a cellular phone whose display device is small in size or has a low resolution so that the number of displayable messages is small. Even when a user scrolls the screen to refer to old messages, it is very difficult to find a desired message in a huge number of messages. Even if the user finds the desired message, the operation for the searching is troublesome. It is possible that the contents of messages posted on a message board by some users are not related to the topic of the message board. It is difficult for new users to post messages on a message board containing many messages which are not related to the topic of the message board.

Japanese Patent Application Laid-Open No. 2007-42137 discloses an art of extracting remarks of designated users alone and displaying the remarks on a message board to overcome the foregoing problem of a message board which allows unspecified users to post messages. Japanese Patent Application Laid-Open No. 2006-227711 discloses an art of analyzing messages posted for each community (the same concept as a topic) and classifying discussions currently given in each community.

According to the art disclosed in Japanese Patent Application Laid-Open No. 2007-42137, each user can follow messages posted by other designated users. It is not however guaranteed that designated users are posting only messages related to a given topic (topic of the message board). According to the art disclosed in Japanese Patent Application Laid-Open No. 2006-227711, if messages posted on a community belong to the same classification, each user can easily grasp what kinds of messages are posted on the community at present. When messages belonging to different classifications are posted in parallel, however, the messages may not be classified properly. This art is very vulnerable to so-called troll.

SUMMARY OF THE INVENTION

Accordingly, it is an object of the present invention to provide a message posting system which can easily grasp messages which are included in messages posted on a message board by unspecified users and to which each user wants to refer.

To achieve the object, according to one aspect of the invention, a message posting system according to the invention includes a server unit that provides a message board for each of a plurality of topics in which unspecified users can participate, and a plurality of terminal devices connected to the server unit. In the message posting system, a user of each terminal device is participatable in a topic provided by the server unit to post a message on a corresponding message board.

The server unit includes participating user management means that manages a plurality of users who participate in a predetermined topic in the plurality of topics. The server unit further includes first message board management means that provides a plurality of users participating in the predetermined topic with a first message board for the predetermined topic, and manages messages posted from the terminal devices of the users participating in the predetermined topic by using the first message board. The server unit further includes grouping means that groups a plurality of users in the managed users participating in the predetermined topic according to a predetermined rule. The server unit further includes group user management means that manages the grouped users. The server unit further includes second message board management means that provides the plurality of grouped users with a second message board for a particular topic different from the predetermined topic, and manages messages posted from the terminal devices of the grouped users as users participating in the particular topic by using the second message board. The server unit further includes posted message management control means that receives a message transmitted from each of the plurality of terminal devices, and allows the first message board management means or the second message board management means to manage the received message as a posted message according to a topic related to the received message. The server unit further includes message board information transmission means that transmits information according to contents of the first message board managed by the first message board management means or information according to contents of the second message board managed by the second message board management means to the terminal devices of those users who participate in a topic corresponding to each message board.

Each of the plurality of terminal devices includes posting message input means that inputs a message to be posted on a topic in which the user of the local terminal device participates. Each of the plurality of terminal devices further includes posted message transmission means that transmits the input message to the server unit in association with the topic on which the message is to be posted and the user who has posted the message. Each of the plurality of terminal devices further includes message board display means that displays, on a display device, a message board containing messages posted by individual users on the topic in which the user of the local terminal device participates, according to the information transmitted from the server unit.

In the message posting system, the grouping means may group those users who belong to the plurality of users participating in the predetermined topic and have posted messages on the predetermined topic within a predetermined period.

In the message posting system, each of the plurality of terminal devices may further include message designation means that designates a desired message in messages posted on the predetermined topic by one of users when the user of the local terminal device is participating in the predetermined topic. Each of the plurality of terminal devices may further include designated message transmission means that transmits information indicating the designated message to the server unit in association with the user who has designated the message. In this case, the grouping means may receive information transmitted from each of the plurality of terminal devices, and group those users who have designated the same message on the predetermined topic according to the received information.

DETAILED DESCRIPTION OF THE PREFERRED EMBODIMENT

A preferred embodiment of the present invention will be described below with reference to the accompanying drawings.

Figure 1:
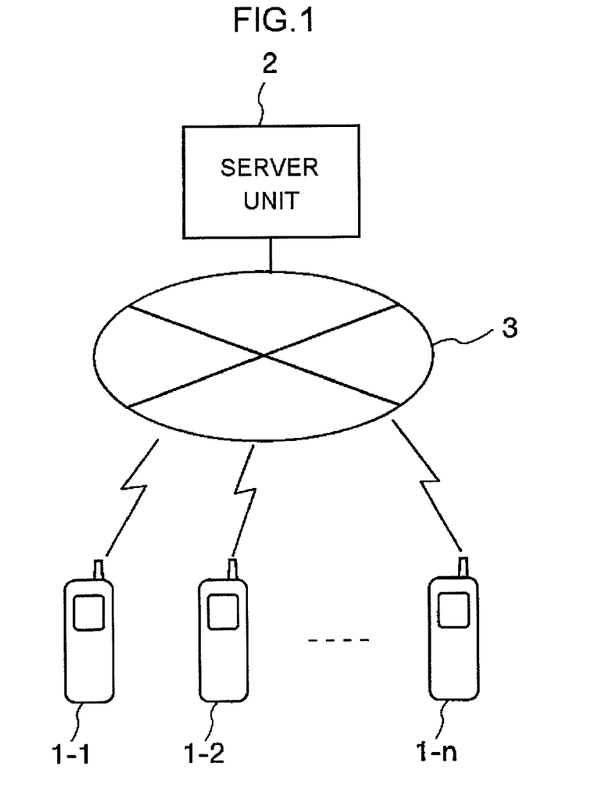
FIG. 1 is a block diagram showing a message posting system according to one embodiment of the present invention.

FIG. 1 is a diagram showing the configuration of a network system which is adapted to a message posting system according to the embodiment. As illustrated, the network system includes a server unit 2 and a plurality of cellular phones 1 (1-1 to 1-n) connected to one another over a network 3 including a cellular phone network and the Internet.

The server unit 2 provides message boards for a plurality of topics in each of which unspecified users can participate. Each cellular phone 1 has a browser application program which is executed by its user to display a message board for a topic in which the user of the cellular phone 1 participates and post a message using the browser capability. The message boards for individual topics provided by the server unit 2 and the display of a message board on the cellular phone 1 will be described in detail later.

Figure 2:
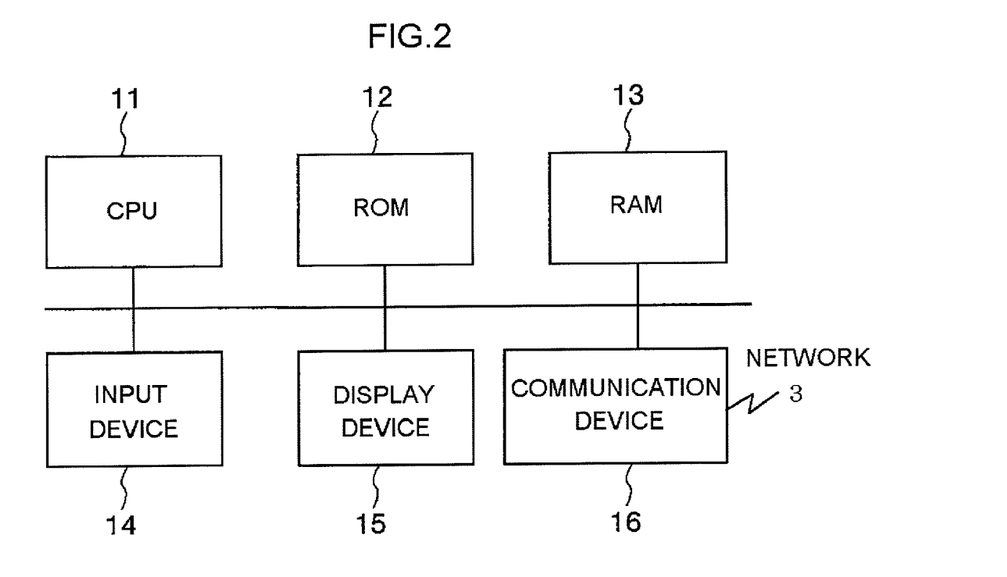
FIG. 2 is a block diagram showing the configuration of a cellular phone in FIG. 1.

FIG. 2 is a block diagram showing the configuration of the cellular phone 1 in FIG. 1. As illustrated, the cellular phone 1 has a CPU (Central Processing Unit) 11, an ROM (Read Only Memory) 12, an RAM (Random Access Memory) 13, an input device 14, a display device 15, and a communication device 16. The cellular phone 1 has other components necessary for talking, which are not illustrated for they are not directly related to the invention.

The CPU 11 executes a program stored in the ROM 12 to perform processes necessary to display a message board and post a message. The CPU 11 includes an internal timer. The ROM 12 stores an execution program for the CPU 11, which includes an application program for a browser or the like. At least a part of the ROM 12 is constituted by a electrically programmable/erasable flash memory. The RAM 13 is backed up by a battery and is used as a work area for the CPU 11.

The input device 14 includes numerical keys "1" to "0", "*" key, "#" key and direction keys, and inputs necessary information to the CPU 11 by a user's operation. A message to be posted on a message board can be input by performing a predetermined operation on those keys. The display device 15 is comprised of a liquid crystal display or the like, and displays a screen for a message board using the browser capability. The communication device 16 transmits/receives information to/from the server unit 2 over the network 3.

Figure 3:
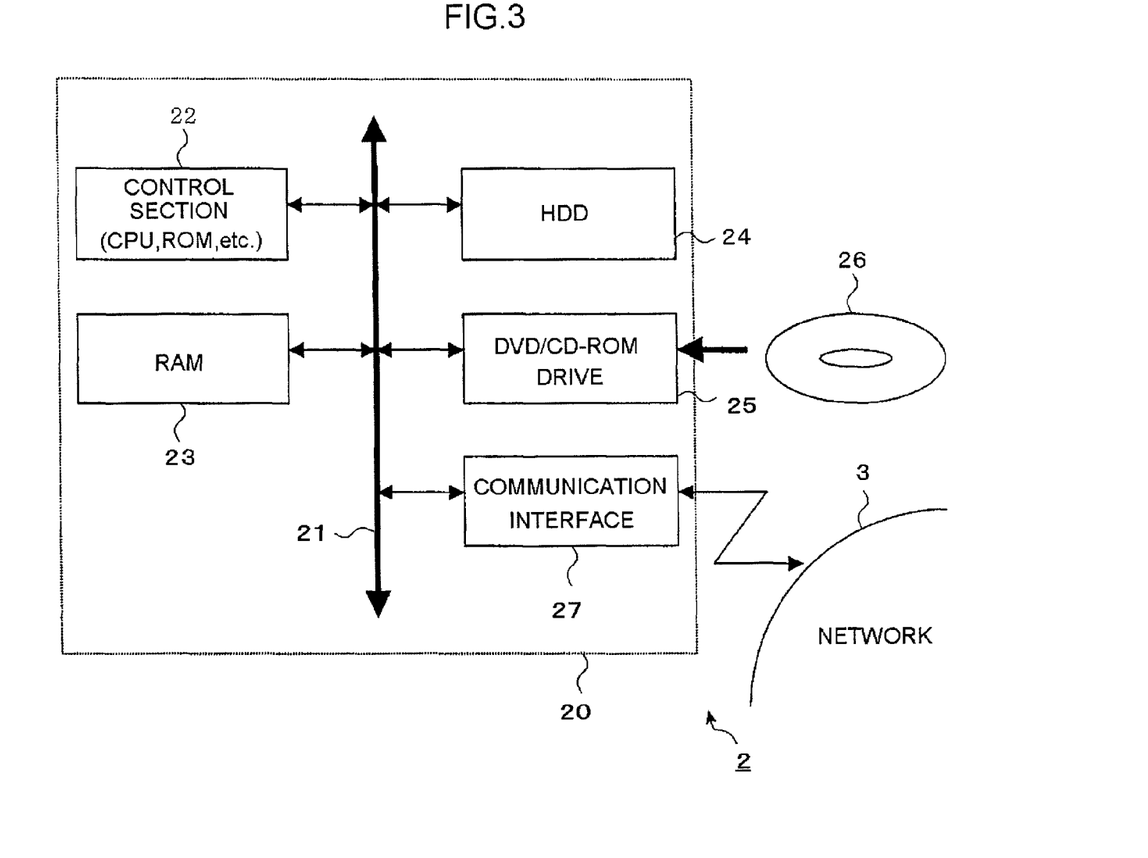
FIG. 3 is a block diagram showing the configuration of a server unit in FIG. 1.

FIG. 3 is a block diagram showing the configuration of the server unit 2. As illustrated, the server unit 2 essentially has a server body 20 including a control section 22, an RAM 23, a hard disk drive (HDD) 24, a DVD/CD-ROM drive 25, and a communication interface 27, which are connected to an internal bus 21. A recording medium (DVD-ROM or CD-ROM) 26 can be loaded in the DVD/CD-ROM drive 25.

The control section 22 includes a CPU, ROM, etc., and executes a program stored in the HDD 24 or the recording medium 26 to control the server body 20. The RAM 23 is a work area for the control section 22. The HDD 24 is a storage area for saving a program and data. The communication interface 27 is connected to the network 3 to transmit/receive information to/from the cellular phone 1.

The program and data which provide the server unit 2 with the message board capability are initially stored in, for example, the recording medium 26. The program and data are read out and loaded into the RAM 23 by the DVD/CD-ROM drive 25 at the time the program is executed. The control section 22 processes the program and data loaded into the RAM 23 to execute transmission/reception of information to/from the cellular phone 1 and manage a message board for each topic (messages posted on the message board for each topic, information (including a mail address) on users who participate in each topic). Intermediate data during execution of a process by the control section 22 is stored in the RAM 23.

The management of message boards for individual topics provided by the server unit 2, the display of a message board on the cellular phone 1 and posting of messages therewith will be described in detail below. FIGS. 4A to 4E are diagrams exemplarily showing message boards which are provided by the server unit 2 and displayed on the display device 15 of the cellular phone 1 in the message posting system according to the embodiment.

Figure 4A:
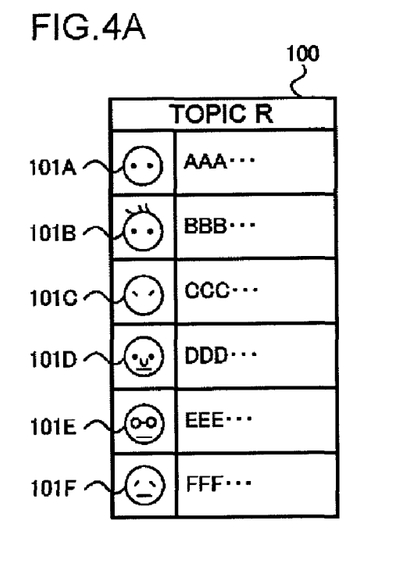
FIGS. 4A to 4E are diagrams exemplarily showing message boards which are provided by the server unit and displayed on the display device of the cellular phone in the message posting system according to the embodiment of the invention.

FIG. 4A is a diagram showing a message board for a topic R in message boards provided by the server unit 2, as an initial status in explaining the message posting system according to the embodiment. Six users A to F participate in the topic R, and the server unit 2 manages information which can specify at least the cellular phone 1 corresponding to each of the users A to F participating in the topic R and the mail address of each user in the HDD 24 or the like. To participate in the topic R, each of the users A to F needs to announce the intention of the participation and register the mail address or the like of the user beforehand. There is no condition provided to participate in the topic R other than the pre-registration.

In a message board 100 as shown in FIG. 4A, latest messages posted by the users A to F are displayed in association with icons 101A to 101F respectively indicating the users A to F, and a plurality of messages are not displayed with respect to a single user. Newer comments sorted are displayed on the message board 100. In the example in FIG. 4A, it is the user A among the users A to F who has posted a message last, and it is the user B who has posted a message before the user A. It is the user F who has not posted a message over the longest period of time.

The server unit 2 has management tables provided in the HDD 24 to manage message boards for individual topics (including the topic R and a temporary topic T to be described later). For the message board for each topic, the server unit 2 manages individual messages received from the cellular phones 1 in association with the users who have posted the messages in the management table for each message board in the sequence of reception.

To browse a message board for a topic which is not displayed on the display device 15, the cellular phone 1 of each of the users A to F transmits a transmission request for the message board for the topic to the server unit 2. With a message board displayed on the display device 15, a transmission request for a latest message board for the topic is transmitted to the server unit 2 regularly (e.g., every one minute).

Upon reception of the transmission request from the cellular phone 1, the control section 22 of the server unit 2 edits the message board 100 to be displayed on the display device 15 of each cellular phone 1 based on the messages which are managed for each message board, and transmits information on the edited message board to the cellular phone 1. Upon reception of the information on the message board 100 edited by the server unit 2 from the server unit 2, the cellular phone 1 displays the message board 100 on the display device 15 according to the received information on the message board.

Next, it is assumed that the user C inputs a message to be posted on the message board for the topic R by operating the input device 14 of the local cellular phone 1, and instructs to post the message by operating the input device 14. At this time, the input message (XXX . . . in this example) is transmitted to the server unit 2 from the cellular phone 1 of the user C in association with the corresponding topic (topic R in this example) and the user who will post the message (user C in this example). Upon reception of the message (XXX . . . ) transmitted from the cellular phone 1 of the user C, the control section 22 of the server unit 2 manages the message in the management table for the topic R.

Figure 4B:
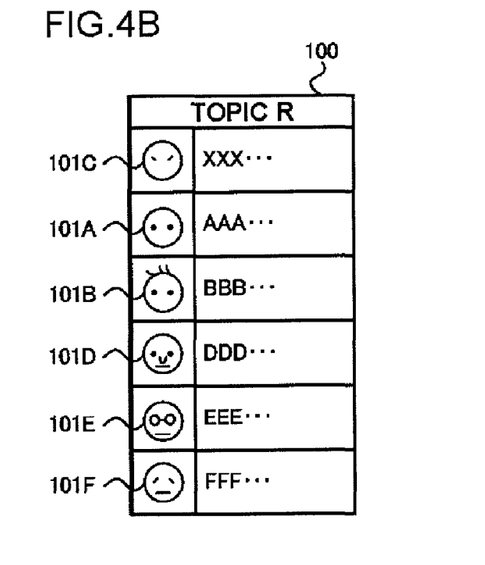

The message board 100 which is displayed on the display device 15 according to information transmitted in response to the transmission request from any cellular phone 1 after the message (XXX . . . ) transmitted from the cellular phone 1 of the user C is managed in the management table for the topic R becomes as shown in FIG. 4B. That is, as the latest message posted by the user C becomes XXX . . . , the message XXX . . . is displayed in association with the icon 101c of the user C in place of the message CCC . . . displayed up to now. Because the message XXX . . . posted by the user C is newer than the message AAA . . . posted by the user A, the message XXX . . . is displayed at the top on the message board 100, the message AAA . . . posted by the user A is displayed at the second row from the top, and the message BBB . . . posted by the user B is displayed at the third row from the top.

Each of the users A to F participating in the topic R can designate a desired message contained in the message board 100 as a watch target by operating the input device 14 with the message board 100 for the topic R being displayed on the display device 15 of the local cellular phone 1. The message to be designated as a watch target may be a message posted by the user himself/herself or a message posted by another user. Designation of a message as a watch target can be canceled by operating the input device 14.

Figures 4C, 4D, 4E:
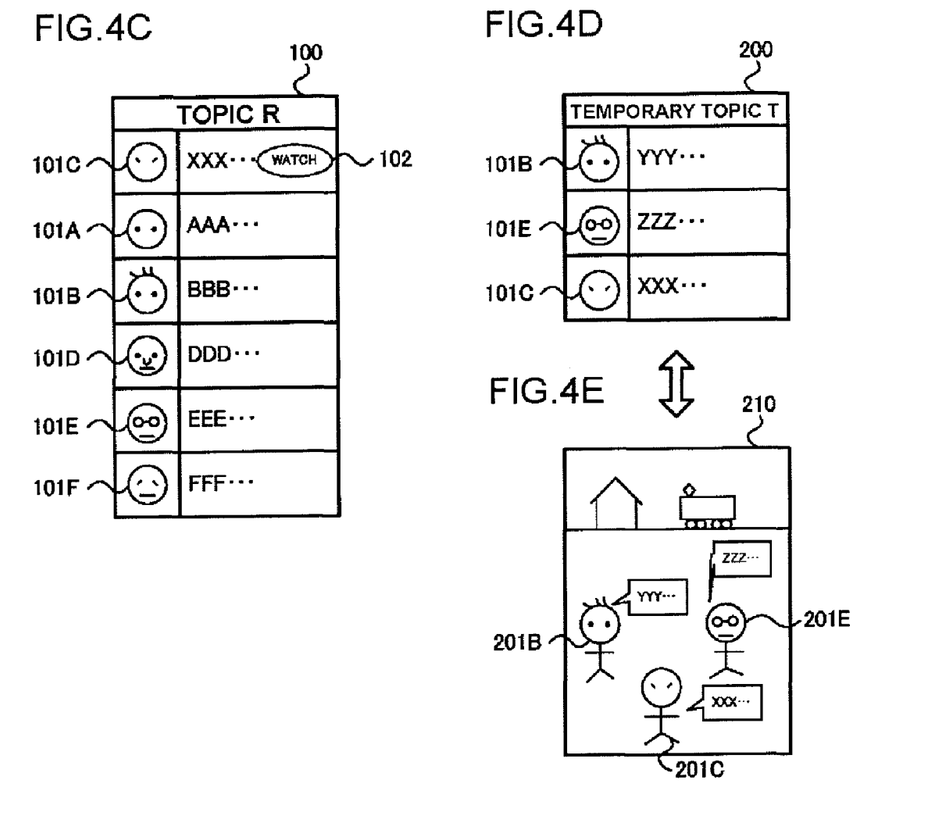

When a message is designated as a watch target, as shown in FIG. 4C, a watch target mark (WATCH) 102 is added to the designated message. When a message designated as a watch target is the message posted by the local user, information indicating that the message is designated as the watch target at that point of time is transmitted to the server unit 2 from the cellular phone 1, so that the designation of the local message is managed in the management table.

In case where the designated message is not the one posted by the local user, when the user inputs a new message through the input device 14 following the designation of the watch target and instructs message posting without canceling the designation, the message to be posted is transmitted to the server unit 2 from the cellular phone 1 in association with the message designated as the watch target. The server unit 2 manages the posted message together with the designation of the message to be watched in the management table.

When a plurality of users designate the same message (message XXX . . . of the user C in this example) within a given period (e.g., within 30 minutes from posting of a message to be watched), the control section 22 of the server unit 2 groups those users among the users participating in the topic R who have designated the message XXX . . . of the user C as a watch target, and provides the grouped users with the message board for a temporary topic T different from the topic R. While the same management of the users and message board as done for the topic R is executed for the temporary topic T, the message XXX . . . of the user C and messages posted by other users after the message XXX . . . is designated as a watch target are also managed in the management table for the message board for the temporary topic T.

Assuming that the users B, C and E have designated the message XXX . . . of the user C as a watch target, information (e.g., URL or the like) for accessing the message board for the temporary topic T is notified to the cellular phones 1 of the users B, C and E from the server unit 2 (the information may be notified on the message board for the topic R or may be notified in a separate mail transmitted). When the users B, C, E access the message board for the temporary topic T according to the information notified from the server unit 2, as shown in FIG. 4D, a message board 200 for the temporary topic T is displayed on the display device 15 of the cellular phone 1 of the users B, C, E.

The message board for the temporary topic T may not have a format similar to that of the message board for the topic R as shown in FIG. 4D, but may be a message board 210 having a format as shown in FIG. 4E which shows avatars 201B, 201C and 201E of the users (users B, C, E in this example) participating in the temporary topic T on a predetermined background and shows messages posted by the respective users in balloons affixed to the avatars 201B, 201C and 201E.

An arbitrary one of the message board 200 shown in FIG. 4D and the message board 210 shown in FIG. 4E may be displayed on the display device 15 according to the user's selection. The display mode of a message board may be changed over in the cellular phone 1 with the same message board information to be edited by the server unit 2 for the message board 200 shown in FIG. 4D and the message board 210 shown in FIG. 4E.

For the message board for the temporary topic T, like message boards for other topics, the message board 200 to be displayed on the display device 15 of each cellular phone 1 can be edited based on the messages managed in the management table for the message board for the temporary topic T, and information on the edited message board can be transmitted. Even when a message is posted on the message board 200 for the temporary topic T, a basically same process as done for the message board for the topic R is executed, in addition to which a mail notifying posting of a new message is transmitted to the cellular phones 1 of the other users participating in the temporary topic T.

Further, the user who becomes a participant in the temporary topic T may be able to designate leaving from the temporary topic T by operating the input device 14 of the local cellular phone 1. Information designating leaving from the temporary topic T can be transmitted to the server unit 2 from the cellular phone 1, so that the server unit 2 can delete the user who has designated leaving from the temporary topic T from the users participating in the temporary topic T. When a single user participating in the temporary topic T remains, the message board for the temporary topic T may be closed, and the user of the server unit 2 may transmit a mail notifying closing the message board for the temporary topic T to the cellular phone 1 of the single remaining user.

Although messages posted on the message board for each topic are managed by the server unit 2 in the sequence of reception of the messages, a user may instruct the display of a past log by operating the input device 14 of the cellular phone 1, and request the server unit 2 to display the past log. The server unit 2 which has received the transmission request for the past log can transmit past log information having messages posted by the individual users sorted in the management sequence to the requesting cellular phone 1, and display the past log information on the display device 15. Even when there is a large number of messages contained in the past log, all the messages can be displayed by, for example, display scroll.

As described above, while in the message posting system according to the embodiment the server unit 2 provides message boards for a plurality of topics, the message posting system can allow many unspecified users to participate in each topic only on the condition that the mail addresses or the like of the users should be registered beforehand. Because the contents of message to be posted on a message board for each topic are not restricted, a message having contents different from the subject of the topic may be posted, or a plurality of subjects may be discussed in parallel. In addition, because the time interval between postings is not restricted, many messages may be posted in a short period of time.

When a specific user participating in each topic posts a message having unique contents on a message board for the topic which is provided by the server unit 2, for example, it is likely that other users argue against the message and post many messages in a short period of time, or the discussion is changed to a subject different from the subject of the topic which has been discussed among some users in the past.

By way of contrast, in the message posting system according to the embodiment, for example, an arbitrary message posted on the message board 100 for the topic R can be designated as a watch target, but when there are a plurality of users who have posted new messages with respect to the same message as a watch target, only the users who have designated the same message as a watch target (users B, C and E in the example of FIGS. 4A to 4E) are grouped together and the users in the group are provided with the message board 200 for the temporary topic T. Then, only the users who want to develop discussion on the message designated as a watch target post messages on the message board 200 for the temporary topic T to develop discussion.

Accordingly, even when a message having unique contents is posted on the message board 100 for the topic R and there are intensive responses of other users to the message, the messages in the intensive responses are posted on the message board 200 for the temporary topic T which is provided only to the users who have responded to this message, not to the message board 100 for the original topic R. This prevents many messages from being posted on the message board 100 for the original topic R in a short period of time.

Even if the subject to be discussed in response to a message which is to be designated as a watch target (the message is likely to have unique contents) is shifted in a direction different from the intrinsic subject of the original topic R, the discussion shifted in the direction different from the intrinsic subject is carried out in the message board 200 for the temporary topic T. Therefore, it is less likely that the subject of messages to be posted on the message board 100 for the original topic R is changed.

Even when many messages are posted intensively in response to a message having unique contents in a short period of time, or even when the subject is shifted by messages posted intensively, it appears as if such a subject shifting problem had not occurred from the viewpoint of the messages posted on the message board 100 for the topic R. This does not make it difficult to grasp messages which are included in the message posted on the message board 100 for the topic R and to which each user wants to refer.

Even when a past log for the message board 100 for the topic R is displayed, it appears that as if many messages are not posted intensively in response to a message having unique contents in a short period of time, or it appears that as if the subject was not shifted by messages intensively posted. This makes it easy to grasp messages to which each user wants to refer from the past log.

Because the users who are grouped together to be led to the message board 200 for the temporary topic T are the users who had responded to the same message in the same period, a message board for a temporary topic is not provided wastefully even when many messages are posted intensively in response to a unique message in a short period of time.

Further, the message board 100 for the topic R or the message board 200 for the temporary topic T shows only one latest posted message for each user, and displays messages sorted in the latest-to-oldest order of the posting time. Accordingly, even a terminal device, such as the cellular phone 1 which has the display device 15 with the restricted size (resolution) installed therein, does not have difficulty in viewing messages posted by individual users.

As the icons 101A to 101F of the users who have posted messages are associated with the respective messages, it becomes easier to visually grasp a user who has posted a message. In addition, as posted messages are displayed in the balloons affixed to the avatars 201B, 201C and 201E of the individual users in the message board 210 for the temporary topic T, it is possible to give a visual impression such that the users participating in the temporary topic T are talking, thus bringing about joyful feeling in the conversation among the users.

Further, when a new message is posted on the message boards 200, 210 for the temporary topic T, a mail notifying the posting of the new message is sent to other users participating in the temporary topic T other than the user who has posted that message. This makes it possible to provoke smooth resuming of the discussion on the newly posted message even when the discussion among the users participating in the temporary topic T is temporarily interrupted.

The invention is not limited to the foregoing embodiment, and can be modified and adapted in various other forms. The following will describe modifications of the embodiment which are adaptable to the invention.

According to the foregoing embodiment, a temporary topic T which is generated by users who belong to those participating in a topic R and designate the same message as a watch target is considered merely as a transient topic, and the users participating in the temporary topic T remain as the users participating in the topic R. However, one of the users participating in the temporary topic T may instruct the permanentization of the temporary topic by operating the input device 14.

When information instructing the permanentization of the temporary topic T is sent to the server unit 2 from the cellular phone 1, the control section 22 of the server unit 2 may regenerate a message board for the temporary topic T as a message board for a permanent topic T as done for the topic R. At this time, of the users participating in the topic R, those users who will participate in the temporary topic T may be eliminated from the users participating in the topic R and become users associated with the newly generated permanent topic T. Of course, those users may be left participating in the topic R.

According to the embodiment, of the users A to F participating in the topic R, the users B, C and E who have designated the same message as a watch target within a predetermined period are grouped together to become the users who participating in the temporary topic T. However, the control section 22 of the server unit 2 may analyze messages respectively posted by the users A to F participating in the topic R, group those users who have posted messages on a subject different from the original subject of the topic R, and allow the grouped users to participate in the temporary topic T. This can ensure smooth development of the discussion on the original subject on the message board for the topic R.

According to the foregoing embodiment, while a message to be designated as a watch target can be a message posted by each user, even when a temporary topic is generated based on the event that a plurality of users have designated a message posted by one user as a watch target, the user who has posted this message does not become a user who participates in the temporary topic unless the user himself/herself has designated the message as a watch target. As a modification, a message posted by each user may be treated as the one designated as a watch target, regardless of whether or not the user himself/herself has designated the message as a watch target. (It is to be noted that the user is not counted in the number of users who have designated the message as a watch target.)

In the case of the foregoing embodiment, for example, the message XXX . . . of the user C is designated as a watch target by the users B and E even if the user C himself/herself does not designate the message as a watch target. In this case, there are multiple users who have posted messages designating the message XXX . . . of the user C as a watch target, so that a temporary topic T is generated. At this time, the users B and E who have posted messages designating the message XXX . . . of the user C as a watch target as well as the user C who has posted the message XXX . . . which is set as the watch target can be included as the users participating in the temporary topic T.

According to the embodiment, with a message posted by another user being designated as a watch target when a user posts a new message with respect to the former message as the watch target, information indicating that the user has designated the message posted by another user is set as the watch target is notified to the server unit 2. There may be a case where before a user posts a new message after designating a message posted by another user as a watch target, the another user posts a new message. In this case, if the message board 100 to be displayed on the display device 15 is updated, the message as the watch target is not displayed.

When a message posted by another user is designated as a watch target, therefore, the message designated as the watch target may be kept displayed on the display device 15 until the designation of the watch target is canceled or a temporary topic based on the message to be watched is generated. As one scheme to achieve the modification, when a message posted by another user is designated as a watch target, a message from the user who has posted the message designated as the watch target may not be updated until the designation of the watch target is canceled or a temporary topic based on the message to be watched is generated. Alternatively, the message designated as a watch target may be displayed separately from a latest message board.

The foregoing description of the embodiment has been given of the case where the cellular phone 1 is adopted as a terminal device with which a user browses a message board. However, other types of terminal devices, such as a video game machine, a general-purpose personal computer, a PDA (Personal Digital Assistant) and a portable game machine, may be used as long as they have components similar to those of the cellular phone 1. The invention is favorably adapted to a terminal device, such as the cellular phone 1, which is significantly restricted on the resolution of the display device; particularly favorably terminal devices include a PDA and a portable game machine in addition to the cellular phone 1.

The cellular phone 1 according to the embodiment displays a message board and allows a user to post a message using the built-in browser capability. This capability can be implemented by a dedicated application program. The dedicated application program may be downloaded from the server unit 2 and stored in the ROM 12 of the cellular phone 1. A cellular phone having the dedicated application program preinstalled in the ROM 12 may be provided. In case where a memory card having the program installed therein can be mounted in a cellular phone, for example, the dedicated application program may be stored in the memory card for distribution. In addition, the program can be distributed by various other methods according to the types of terminal devices to be used as a platform.

According to the foregoing embodiment, the program and data in the server unit 2 are stored in the recording medium 26 for distribution. However, the program and data may be prestored in the HDD 24. In addition, the program and data may be stored in a fixed disk device provided in another server unit located on the network 3, and may be distributed to the server unit 2 over the network 3. The program and data received from another server unit via the communication interface 27 in the server unit 2 can be stored in the HDD 24, and loaded into the RAM 23 at the time the program is executed.

FIG. 1

2: SERVER UNIT

FIG. 2

14: INPUT DEVICE

15: DISPLAY DEVICE

16: COMMUNICATION DEVICE

3: NETWORK

FIG. 3

22: CONTROL SECTION

25: DVD/CD-ROM DRIVE

27: COMMUNICATION INTERFACE

3: NETWORK

FIG. 4A

TOPIC R

FIG. 4B

TOPIC R

FIG. 4C

What is claimed is:

1. A message posting system comprising:
a server unit that provides a message board for each of a plurality of topics in which unspecified users can participate; and
a plurality of terminal devices connected to the server unit, a user of each terminal device being participatable in a topic provided by the server unit to post a message on a corresponding message board,
the server unit including:
  participating user management means that manages a plurality of users who participate in a predetermined topic in the plurality of topics;
  first message board management means that provides a plurality of users participating in the predetermined topic with a first message board for the predetermined topic, and manages messages posted from the terminal devices of the users participating in the predetermined topic by using the first message board;
  grouping means that groups a plurality of users in the managed users participating in the predetermined topic according to a predetermined rule;
  group user management means that manages the grouped users;
  second message board management means that provides the plurality of grouped users with a second message board for a particular topic different from the predetermined topic, and manages messages posted from the terminal devices of the grouped users as users participating in the particular topic by using the second message board;
  posted message management control means that receives a message transmitted from each of the plurality of terminal devices, and allows the first message board management means or the second message board management means to manage the received message as a posted message according to a topic related to the received message; and
  message board information transmission means that transmits information according to contents of the first message board managed by the first message board management means or information according to contents of the second message board managed by the second message board management means to the terminal devices of those users who participate in a topic corresponding to each message board,
each of the plurality of terminal devices including:
  posting message input means that inputs a message to be posted on a topic in which the user of the local terminal device participates;
  posted message transmission means that transmits the input message to the server unit in association with the topic on which the message is to be posted and the user who has posted the message; and
  message board display means that displays, on a display device, a message board containing messages posted by individual users on the topic in which the user of the local terminal device participates.

2. The message posting system according to claim 1, wherein the grouping means groups those users who belong to the plurality of users participating in the predetermined topic and have posted messages on the predetermined topic within a predetermined period.

3. The message posting system according to claim 1, wherein each of the plurality of terminal devices further includes:
  message designation means that designates a desired message in messages posted on the predetermined topic by one of users when the user of the local terminal device is participating in the predetermined topic; and
  designated message transmission means that transmits information indicating the designated message to the server unit in association with the user who has designated the message, and
  the grouping means receives information transmitted from each of the plurality of terminal devices, and groups those users who have designated the same message on the predetermined topic according to the received information.

4. A computer apparatus, connected to a plurality of unspecified terminal devices, for providing a message board for each of a plurality of topics and allowing a user of each of the terminal devices to post a message on a message board for an arbitrary topic in which the user participates, comprising:
  participating user management means that manages a plurality of users who participate in a predetermined topic in the plurality of topics;
  first message board management means that provides a plurality of users participating in the predetermined topic with a first message board for the predetermined topic, and manages messages posted from the terminal devices of the users participating in the predetermined topic by using the first message board;
  grouping means that groups a plurality of users in the managed users participating in the predetermined topic according to a predetermined rule;
  group user management means that manages the grouped users;
  second message board management means that provides the plurality of grouped users with a second message board for a particular topic different from the predetermined topic, and manages messages posted from the terminal devices of the grouped users as users participating in the particular topic by using the second message board;
  posted message management control means that receives a message transmitted from each of the plurality of terminal devices, and allows the first message board management means or the second message board management means to manage the received message as a posted message according to a topic related to the received message; and
  message board information transmission means that transmits information according to contents of the managed first message board or information according to contents of the managed second message board to the terminal devices of those users who participate in a topic corresponding to each message board.

5. A method of providing a message board for each of a plurality of topics and allowing a user of each of a plurality of unspecified terminal devices to post a message on a message board for an arbitrary topic in which the user participates, comprising:
  managing a plurality of users who participate in a predetermined topic in the plurality of topics;
  providing a plurality of users participating in the predetermined topic with a first message board for the predetermined topic, and managing messages posted from the terminal devices of the users participating in the predetermined topic by using the first message board;

grouping a plurality of users in the managed users participating in the predetermined topic according to a predetermined rule;

managing the grouped users;

providing the plurality of grouped users with a second message board for a particular topic different from the predetermined topic, and managing messages posted from the terminal devices of the grouped users as users participating in the particular topic by using the second message board;

receiving a message transmitted from each of the plurality of terminal devices, and allowing the first message board management means or the second message board management means to manage the received message as a posted message according to a topic related to the received message; and transmitting information according to contents of the managed first message board or information according to contents of the managed second message board to the terminal devices of those users who participate in a topic corresponding to each message board.

6. A recording medium recording a program to be executed by a computer apparatus, connected to a plurality of unspecified terminal devices, for providing a message board for each of a plurality of topics and allowing a user of each of the terminal devices to post a message on a message board for an arbitrary topic in which the user participates, the program managing a plurality of users who participate in a predetermined topic in the plurality of topics;

providing a plurality of users participating in the predetermined topic with a first message board for the predetermined topic, and managing messages posted from the terminal devices of the users participating in the predetermined topic by using the first message board;

grouping a plurality of users in the managed users participating in the predetermined topic according to a predetermined rule;

managing the grouped users;

providing the plurality of grouped users with a second message board for a particular topic different from the predetermined topic, and managing messages posted from the terminal devices of the grouped users as users participating in the particular topic by using the second message board;

receiving a message transmitted from each of the plurality of terminal devices, and allowing the first message board management means or the second message board management means to manage the received message as a posted message according to a topic related to the received message; and transmitting information according to contents of the managed first message board or information according to contents of the managed second message board to the terminal devices of those users who participate in a topic corresponding to each message board.

\* \* \* \* \*